United States Patent
Li et al.

(10) Patent No.: US 11,164,001 B2
(45) Date of Patent: Nov. 2, 2021

(54) METHOD, APPARATUS, AND SYSTEM FOR AUTOMATICALLY ANNOTATING A TARGET OBJECT IN IMAGES

(71) Applicant: Alibaba Group Holding Limited, Grand Cayman (KY)

(72) Inventors: Boren Li, Hangzhou (CN); Hongwei Xie, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/648,285

(22) PCT Filed: Sep. 19, 2018

(86) PCT No.: PCT/CN2018/106493
§ 371 (c)(1),
(2) Date: Mar. 18, 2020

(87) PCT Pub. No.: WO2019/062619
PCT Pub. Date: Apr. 4, 2019

(65) Prior Publication Data
US 2020/0265231 A1   Aug. 20, 2020

(30) Foreign Application Priority Data
Sep. 29, 2017 (CN) .......................... 201710912283.0

(51) Int. Cl.
*G06K 9/00* (2006.01)
*G06T 7/73* (2017.01)

(52) U.S. Cl.
CPC ............ *G06K 9/00671* (2013.01); *G06T 7/74* (2017.01); *G06T 2207/20081* (2013.01); *G06T 2207/30204* (2013.01)

(58) Field of Classification Search
CPC ... G06T 7/74; G06T 7/73; G06T 2207/30204; G06T 2207/20081; G06T 7/75;
(Continued)

(56) References Cited

U.S. PATENT DOCUMENTS 7,098,435 B2   8/2006 Mueller et al.
7,271,377 B2   9/2007 Mueller et al.
(Continued)

FOREIGN PATENT DOCUMENTS

CN   106599051 A   4/2017
CN   106650705 A   5/2017

OTHER PUBLICATIONS

International Search Report to corresponding International Application No. PCT/CN2018/106493 dated Nov. 30, 2018 (2 pages).
(Continued)

*Primary Examiner* — Syed Haider
(74) *Attorney, Agent, or Firm* — James J. DeCarlo; Greenberg Traurig, LLP

(57) ABSTRACT

Embodiments of the disclosure disclose a method for automatically annotating a target object in images. In one embodiment, the method comprises: obtaining an image training sample including a plurality of images, wherein each image of the plurality of images is obtained by photographing a same target object, and the adjacent images share one or more same environmental feature points; using one of the plurality of images as a reference image to determine a reference coordinate system, and create a three-dimensional space model based on the three-dimensional reference coordinate system; determining the position information of the target object in the three-dimensional reference coordinate system upon the three-dimensional space model being moved to the position of the target object in the reference image; and mapping the three-dimensional space
(Continued)

model to image planes of each image, respectively, based on respective camera pose information determined based on environmental feature points in each image.

20 Claims, 13 Drawing Sheets

(58) Field of Classification Search
CPC . G06T 2207/20104; G06T 2207/20084; G06T 2207/30244; G06K 9/00; G06K 9/00671; G06K 9/627; G06K 9/00201
See application file for complete search history.

(56) References Cited

U.S. PATENT DOCUMENTS

| | | | |
|---|---|---|---|
| 7,386,799 | B1 | 6/2008 | Clanton et al. |
| 7,619,626 | B2 | 11/2009 | Bernier |
| 9,400,941 | B2 | 7/2016 | Kurz et al. |
| 9,888,973 | B2 | 2/2018 | Olson et al. |
| 10,061,287 | B2 | 8/2018 | Laulagnet et al. |
| 10,186,049 | B1 | 1/2019 | Boardman et al. |
| 10,375,357 | B2 | 8/2019 | Wang et al. |
| 10,412,373 | B2 | 9/2019 | Pitts |
| 10,417,781 | B1 * | 9/2019 | Konolige ............ G06T 7/60 |
| 10,445,895 | B2 | 10/2019 | Knorr et al. |
| 10,504,291 | B2 | 12/2019 | Petrovskaya et al. |
| 2002/0075282 | A1 * | 6/2002 | Vetterli ............ G06T 11/60 345/632 |
| 2010/0277571 | A1 | 11/2010 | Xu et al. |
| 2010/0302233 | A1 | 12/2010 | Holland |
| 2014/0145878 | A1 | 5/2014 | Barlett et al. |
| 2017/0061625 | A1 | 3/2017 | Estrada et al. |
| 2017/0151027 | A1 | 6/2017 | Walker et al. |
| 2017/0287166 | A1 | 10/2017 | Claveau et al. |
| 2018/0066945 | A1 | 3/2018 | Meier et al. |
| 2018/0137373 | A1 | 5/2018 | Rasmusson et al. |
| 2018/0189974 | A1 | 7/2018 | Clark et al. |
| 2018/0306584 | A1 | 10/2018 | Merfels |
| 2018/0314877 | A1 | 11/2018 | Srivastava et al. |
| 2018/0336724 | A1 | 11/2018 | Spring et al. |
| 2018/0350056 | A1 | 12/2018 | Cardenas Bernal |
| 2018/0373320 | A1 | 12/2018 | Petrovskaya et al. |
| 2019/0340803 | A1 | 11/2019 | Comer |
| 2020/0004225 | A1 | 1/2020 | Buller et al. |
| 2020/0035009 | A1 | 1/2020 | Comer et al. |

OTHER PUBLICATIONS

Georgakis et al., "Multiview RGB-D Dataset for Object Instance Detection," Cornell Unversity Library, pp. 3-4 (2016).
Lai et al., "A large-scale heirarchical multi-view RGB-D object dataset," Robotics and Automation (ICRA), 2011 IEEE, pp. 1817-1824 (2011).
Extended European Search Report to corresponding EP Application No. 18861929.0 dated Apr. 20, 2021, 10 pages (2021).

* cited by examiner

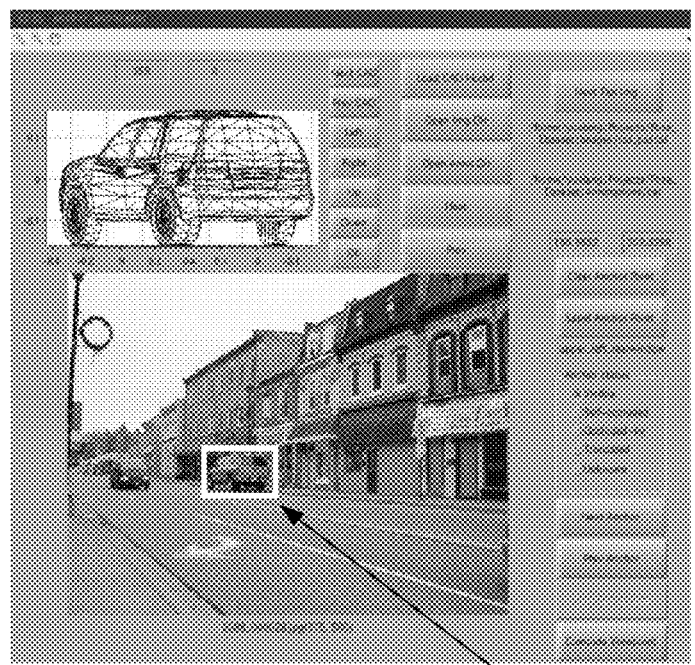
FIG. 1-2                  104

METHOD, APPARATUS, AND SYSTEM FOR AUTOMATICALLY ANNOTATING A TARGET OBJECT IN IMAGES

CROSS-REFERENCE TO RELATED APPLICATIONS

The disclosure is a national stage entry of Int't Appl. No. PCT/CN2018/106493, filed on Sep. 19, 2018, which claims the benefit to priority to Chinese Patent Application No. 201710912283.0, filed on Sep. 29, 2017, both of which are incorporated herein by reference in their entirety.

BACKGROUND

Technical Field

The disclosure relates to the field of image processing technologies and, in particular, to methods, apparatuses, systems for automatically annotating a target object in images.

Description of the Related Art

In augmented reality/virtual reality (AR/VR) applications and the like, machine learning techniques are often applied to recognize scenes/objects in images. In such machine learning processes, a large number of image training samples are used, and target objects in the image training samples are annotated. Annotation generally refers to annotating a target object's positions in images such that a process of machine learning is enabled to extract features from the images of the target object to perform machine learning.

Presently, the annotation of image training samples is classified into two types: one type is annotation based on two-dimensional images, and the other type is three-dimensional image annotation based on a computer-aided design (CAD) model of an object. The two-dimensional image annotation typically refers to annotating, in a two-dimensional image, a rectangular region in which a target object is located. Oftentimes such annotations are manually performed. For example, as shown in FIG. 1-1, an operator needs to manually delineate rectangular boxes (e.g., a rectangular box 102 and a rectangular box 103) around respective target objects (e.g., a cat above and a cat below, respectively) to identify the position of the target object in an image. As such, manual annotation is inefficient, cost-ineffective, labor-intensive, and time-consuming, and especially when there are a large number of image training samples for annotation.

With the technique of the three-dimensional image annotation based on a CAD model of an object, frames in a pre-captured video are used as image training samples. First, a CAD model of a target object is obtained. For example, as shown in FIG. 1-2, when the target object in a video is a car, a CAD model of the car is obtained, and then a mapping relationship between a plurality of points in the CAD model and corresponding feature points of the target object is manually annotated in one of the image frames. Subsequently, the target object can be tracked, by model-based tracking techniques, for annotations in batch. For instance, such a tracking process relies on the annotated feature points of the target object to recognize the position of the target object in other images. As such, the annotation in a 3D space is more automated than two-dimensional image annotation, achieving automatically annotating the entire video by annotating one frame in the video. Also, the automatic annotation has inherent uniformed quantitative criteria in terms of the annotation precision, which is more precise than manual annotation. However, such automatic annotation has disadvantages. For example, a CAD model of a target object is usually provided by a manufacturer or designer of the target object. When the manufacturer or designer cannot provide the CAD model, the automatic annotation cannot be performed as above-described. Thus, it is oftentimes difficult to acquire CAD models for arbitrary target objects. As such, the CAD model based annotation cannot be applied universally. Furthermore, in cases where the CAD model of the target object can be obtained, the tracking of the target object still depends on a sufficient number of feature points on the target object. If the target object is in solid-color, highly reflective, transparent, or the like, the model-based tracking no longer ensures sufficient accuracy in tracking the target object, thus affecting the automatic annotation based thereon.

Thus, there exists a need of technical solutions to a technical problem of how to automatically annotate objects in images with higher accuracy and efficiency, as well as improve the universal-applicability.

SUMMARY

The disclosure provides methods, apparatuses, and systems for automatically annotating an object in images to enable auto-annotation of images with higher accuracy and efficiency, as well as improved universal-applicability.

In one embodiment, the disclosure provides a method for automatically annotating a target object in images, the method comprising: obtaining an image training sample that comprises a plurality of images, wherein each image of the plurality of images is obtained by photographing a same target object, and the adjacent images share one or more same environmental feature points; using one image of the plurality of images as a reference image to determine a reference coordinate system; generating a three-dimensional space model based on the three-dimensional reference coordinate system; determining position information of a target object in the three-dimensional reference coordinate system upon the three-dimensional space model being moved to the position of the target object in the reference image; and mapping the three-dimensional space model to image planes of each image, respectively, based on the position information of the target object in the three-dimensional reference coordinate system and the respective camera pose information determined based on environmental feature points in each image.

In one embodiment, the disclosure provides a method for generating a target object recognition model, the method comprising: obtaining an image training sample comprising a plurality of images, wherein each image of the plurality of images is obtained by photographing a same target object, the adjacent images share one or more same environmental feature points, and each image of the plurality of images further comprises the annotation information of the position of a target object. The method further comprises and generating a recognition model of the target object based on the annotation information of the positions of the target object in the image training sample. In one example the annotation information is obtained via the following: using one of the plurality of images as a reference image; generating a three-dimensional space model based on a three-dimensional reference coordinate system; determining the position information of the target object in the three-dimensional reference coordinate system based on a position to which the three-dimensional space model is moved; and mapping the three-dimensional space model to image planes of each image, respectively, based on respective camera pose information determined based on environmental feature points in each image.

In one embodiment, the disclosure provides a method for providing AR content, the method comprising: obtaining a real-world image; recognizing the position information of a target object in the real-world image using a pre-generated target object recognition model, wherein the target object recognition model is generated using the method described hereinabove; and determining a display position of a virtual image associated with the target object based on the position information of the target object in the real-world image, and displaying the virtual image accordingly.

In one embodiment, the disclosure provides an apparatus for automatically annotating a target object in images, the apparatus comprising: a training sample obtaining unit configured to obtain an image training sample, the image training sample comprising a plurality of images, wherein each image of the plurality of images is obtained by photographing a same target object, and the adjacent images share one or more same environmental feature points; a three-dimensional space model creation unit configured to use one of the plurality of images as a reference image to determine a reference coordinate system, and to create a three-dimensional space model based on the three-dimensional reference coordinate system; a position information determining unit configured to determine the position information of the target object in the three-dimensional reference coordinate system upon n the three-dimensional space model being moved to the position of the target object in the reference image; and a mapping unit configured to map the three-dimensional space model to image planes of each image, respectively, based on the position information of the target object in the three-dimensional reference coordinate system and respective camera pose information determined based on environmental feature points in each image.

In one embodiment, the disclosure provides an apparatus for generating a target object recognition model, the apparatus comprising: an image training sample obtaining unit configured to obtain an image training sample, the image training sample comprising a plurality of images, wherein each image of the plurality of images is obtained by photographing a same target object, the adjacent images share one or more same environmental feature points, each image further comprises the annotation information of the position of the target object; and a recognition model generation unit configured to generate a recognition model of the target object based on the annotation information of the position of the target object in the image training sample. In one example, the annotation information is obtained via the following: using one of the plurality of images as a reference image, creating a three-dimensional space model based on a three-dimensional reference coordinate system, determining the position information of the target object in the three-dimensional reference coordinate system based on a position to which the three-dimensional space model is moved, and mapping the three-dimensional space model to image planes of each image, respectively, based on respective camera pose information determined based on environmental feature points in each image.

In one embodiment, the disclosure provides an apparatus for providing AR content, the apparatus comprising: a real-world image acquisition unit configured to acquire a real-world image and to recognize the position information of a target object in the real-world image using a pre-generated target object recognition model, and a virtual image displaying unit configured to determine a display position of a virtual image associated with the target object based on the position information of the target object in the real-world image and to display the virtual image accordingly. In one example, the target object recognition model is generated using the method as above-described herein.

In one embodiment, the disclosure provides a computer system comprising: one or more processors; and a memory coupled with the one or more processors, wherein the memory is configured to store program instructions, when read and executed by the one or more processors, instructing the computer system to perform the following operations: obtaining an image training sample comprising a plurality of images, wherein each image of the plurality of images is obtained by photographing a same target object, the adjacent images share one or more same environmental feature points, and using one of the plurality of images as a reference image to determine a reference coordinate system; generating a three-dimensional space model based on the three-dimensional reference coordinate system; determining the position information of the target object in the three-dimensional reference coordinate system upon the three-dimensional space model being moved to the position of the target object in the reference image; and mapping the three-dimensional space model to image planes of each image, respectively, based on the position information of the target object in the three-dimensional reference coordinate system and respective camera pose information determined based on environmental feature points in each image of the plurality of images.

According to various embodiments, the disclosure provides the following technical effects.

As a target object is annotated using a relatively regular three-dimensional space model, such annotation has the advantage in that the three-dimensional space model is easier to obtain compared to a CAD model for the target object. Further, in automatically annotating other images using a manually annotated reference image, the three-dimensional space model is mapped back to image planes corresponding to the images based on the changes of the respective camera poses corresponding to the images relative to the camera pose corresponding to the reference image. In other words, the camera poses can be recognized as long as the feature points in the photographing environment (e.g., the environment in which the target object is photographed) are sufficiently distinct. That is, the camera poses are recognized based on the feature points in the entire photographing environment to automatically annotate the target object, instead of recognizing the feature points of the target object to track the target object. As such the target object is automatically annotated despite the fact that the target object is solid-colored, highly reflective, transparent, or the like.

Various embodiments provided by the disclosure do not necessarily require all of the above-described advantages to be achieved at the same time.

BRIEF DESCRIPTION OF THE DRAWINGS

The drawings to be used for the description of the embodiments are briefly introduced below. The drawings in the following description are some embodiments of the disclosure. Those of ordinary skill in the art can also obtain other drawings based on these accompanying drawings without significant e efforts.

FIG. 2 is a diagram illustrating a method for generating a reference coordinate system according to some embodiments of the disclosure.

DETAILED DESCRIPTION

Figure 1:
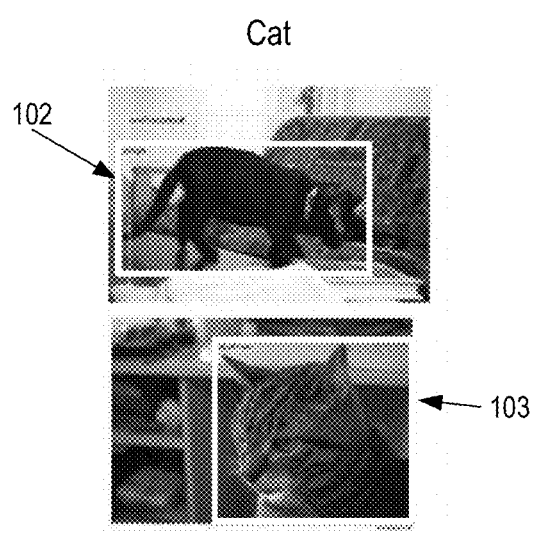
FIG. 1-1 and FIG. 1-2 are diagrams of existing annotation methods.

The technical solutions in the embodiments of the disclosure will be clearly and completely described below with reference to the drawings in the embodiments of the disclosure. The embodiments herein are merely some, rather than all of the embodiments of the disclosure. All other embodiments obtained by those of ordinary skill in the art based on the embodiments of the disclosure fall within the scope of the disclosure.

In some embodiments of the disclosure, an automatic image annotation tool is provided to abstract a target object in an image into a more universally applicable regular object (e.g., a cuboid, or a cylinder), a composite object formed by regular objects, any shape in a three-dimensional space, and the like. This way the technical problem of annotating a target object is converted into a technical problem of annotating a three-dimensional space (e.g., a volume), in which all the objects are annotated as target objects. Thus, when a plurality of images is to be automatically annotated, one of the plurality of images is selected as a reference image, in which a three-dimensional space model (not a CAD model of the target object) is initialized. Next, a user interacts with the three-dimensional space model so that the space model exactly encloses the target object in the image. For example, the user can move the space model, adjust the length, height, or width of the space, and so on. As such, the position of the target object in the reference image is determined based on the position of the three-dimensional space model after the afore-described movement. Further, each image of the plurality of images meets the requirements that it is obtained by photographing a same target object in the same environment, and the adjacent images share one or more same environmental feature points. In some embodiments, the adjacent images are the adjacent image frames in the same video file or the like. In some embodiments, those images are frames in the same video file or the like. As such, the camera poses (e.g., the position, orientation, and the like of a camera with respect to the images taken thereby) corresponding to the images can be obtained by using position tracking techniques such as simultaneous localization and mapping (SLAM). This way, after an annotated position of the target object in the reference image is obtained, the three-dimensional space model is mapped to the image planes of each image, respectively, based on the changes in respective camera poses corresponding to the other images relative to the camera pose corresponding to the reference image. As such, the target object in the images is automatically annotated.

In some embodiments, the process of generating the three-dimensional space model and moving the three-dimensional space model is performed based on a three-dimensional reference coordinate system, which is fixed relative to the images. Further, to determine the camera pose information corresponding to the images, a fixed three-dimensional coordinate system is also used as a reference coordinate system, based on which respective three-dimensional rigid transformation (3D rigid transformation) of camera coordinate systems corresponding to the images to the reference coordinate system is determined. In some embodiments, six-degree-of-freedom (6DoF) camera pose information is obtained based on visual SLAM techniques and the fusion with the sensors of an internal measurement unit (IMU) module at a mobile phone. Thus, in some embodiments, a reference coordinate system is determined before the three-dimensional space model is generated so that the coordinate system is used as a reference in the subsequent generation and movement of the three-dimensional space model, as well as the determination of camera poses in the frames.

Figure 2:
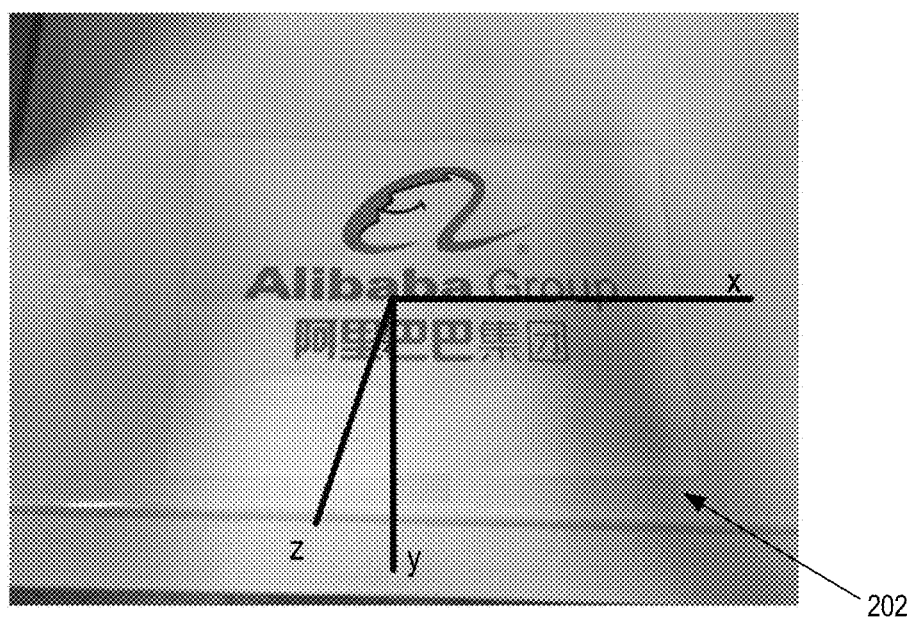

In some embodiments, various methods may be used to determine the three-dimensional reference coordinate system. For example, when the images are images in a same video file, a camera coordinate system of a first frame in the video file is used as the reference coordinate system, based on which the respective changes in the camera poses corresponding to the other frames are determined using the camera pose corresponding to the first frame as a reference. Alternatively, in other embodiments, the three-dimensional reference coordinate system is determined using a preset marker. In this case, the image training samples are obtained in a specific manner. For example, the sample images are frames in a video obtained by performing image acquisition of a target object in the specified manner (details of which is described below) according to some embodiments of the disclosure. During such image acquisition, a preset marker with a planar structure is placed on a table and the like. As shown in FIG. 2, the marker 202 is a piece of paper with a preset pattern (e.g., the Alibaba® logo), or the like. Before photographing a target object, the lens of the camera is positioned to aim at the plane of the marker for photographing. Subsequently, the lens of the camera is moved to the target object for photographing. In some embodiments, during the photographing of the target object, 360-degree photography (e.g., 360 panoramas, the camera spanning a full circle when photographing) or the like is performed at the target object. This way, in the subsequent specific annotation of the target object in the images in the video, a three-dimensional reference coordinate system is e created based on the planar marker information photographed in the first several frames in the video. Afterward, a three-dimensional space model is generated based on the three-dimensional reference coordinate system; and respective camera poses in the images are also determined based on the three-dimensional reference coordinate system.

In some embodiments, the three-dimensional reference coordinate system is generated based the planar marker in the first several images. For instance, the planar marker can be a piece of paper or sheet, having a fixed surface area and the characteristic of being parallel to the ground when placed in relation to the scene for photographing. As such, the three-dimensional reference coordinate system is generated by recognizing the preset pattern in the first several images, based on which the position of the marker is identified. Afterward, the three-dimensional reference coordinate system is established, via the right-hand rule, by designating a central point of the plane at which the marker is located as the origin and the plane itself as the x-y plane. In this example, the three-dimensional reference coordinate system generated has the x-y plane configured parallel to the ground, and the z-axis configured along the direction that is vertically downward from the x-y plane. As such, the three-dimensional reference coordinate system is referred to as a world coordinate system.

According to various embodiments, during a video being captured to perform image acquisition on a target object, setups of introducing a marker to the video are made in preparation for the subsequent generation of a three-dimensional reference coordinate system. This way, the three-dimensional reference coordinate system is determined based on the marker captured in the video file in a subsequent automatic annotation.

In some embodiments, using the example where the images in the same video file are used as the image training samples, a three-dimensional reference coordinate system is first determined. Next, one of the images is selected as a reference image, and a three-dimensional space model is initialized based on the three-dimensional reference coordinate system. For instance, in scenarios where it is required that the final annotation result is to mark a rectangular box delineating the boundaries of the target object, the three-dimensional space model is a cuboid. In scenarios where the final annotation result is to mark a circular shape delineating the boundaries of the target object, the three-dimensional space model is accordingly a cylinder. In other scenarios, the three-dimensional space model can be a composite shape formed by combining a plurality of cuboids, and the like. In some embodiments, the three-dimensional space model is of relatively regular and simple shape as compared to a CAD model used in current systems, entailing no need to be provided by a manufacturer of a particular target object according to the design. Instead, as above-described, a three-dimensional space model can be relatively easily generated.

Figure 3:
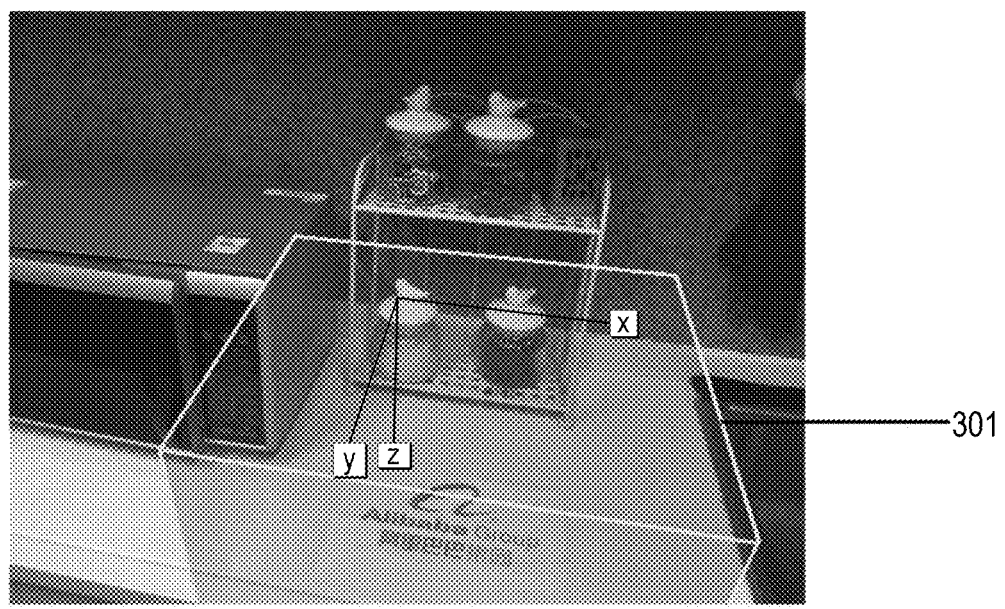
FIG. 3 is a diagram illustrating a three-dimensional space model according to some embodiments of the disclosure.

FIG. 3 is a diagram illustrating a three-dimensional space model according to some embodiments of the disclosure.

Figure 4:
FIG. 4 is a diagram illustrating an annotated reference image according to some embodiments of the disclosure.

As shown herein, the X-Y plane in the world coordinate system is used to initialize a three-dimensional space model 301. In this example, the three-dimensional space model 301 appears in the camera's field of view. Further, a user is enabled to move the three-dimensional space model around. For example, the user may move the three-dimensional space model in the X-Y plane, additionally or alternatively move the three-dimensional space model along the Z direction, if required. In some embodiments, the annotation tool provides alignment via enabling the user to rotate the three-dimensional space model along one or more of the three coordinate axes. In some embodiments, the annotation tool provides other operations via enabling the user to adjust the size of the three-dimensional space model (e.g., a cuboid's length, width, height, and so on). The goal here is to make the three-dimensional space model accurately enclose the target object. For example, as shown in FIG. 4, a three-dimensional space model 401 is such a three-dimensional space model that has been aligned and adjusted to have the target object being located therein. Afterward, confirmation of the annotation of the target object is provided via a user interface element (e.g., a button) of the annotation tool. This way, the manual process of annotating the reference frame is completed at this point in time.

Once the reference frame is manually annotated, the position information of the target object in the three-dimensional reference coordinate system is determined based on the position to which the three-dimensional space model is moved and/or rotated. In some embodiments, the position information is represented by one or more of the following: displacement degrees of freedom the target object in three dimensions of the three-dimensional reference coordinate system, rotational degrees of freedom of the target object in three dimensions of the three-dimensional reference coordinate system, and respective size information of the three-dimensional space model in the three dimensions.

In some embodiments, the image acquisition of a target object is performed in a manner that the target object is stationary, and an image acquisition device is rotated around the target object in a circle to conduct the image acquisition of the target object, thereby generating a video file. This way, the target object is stationary relative to the three-dimensional reference coordinate system. That is, after the position of the target object in the three-dimensional reference coordinate system is determined based on one of the images, the position information is fixed, whereas the respective camera pose changes in other images. Due to such changes in the camera pose, the position, orientation, and size in which the target object appears in the images vary. In one example, the respective camera poses corresponding to each of the images are already determined during the pre-processing. In other words, the rigid transformation information of the camera coordinate systems relative to the three-dimensional reference coordinate system is already determined during the pre-processing. As such, the three-dimensional space model is mapped back in reverse to the image planes of each image, via computation, to automatically annotate the target object in the other images.

Figure 5:
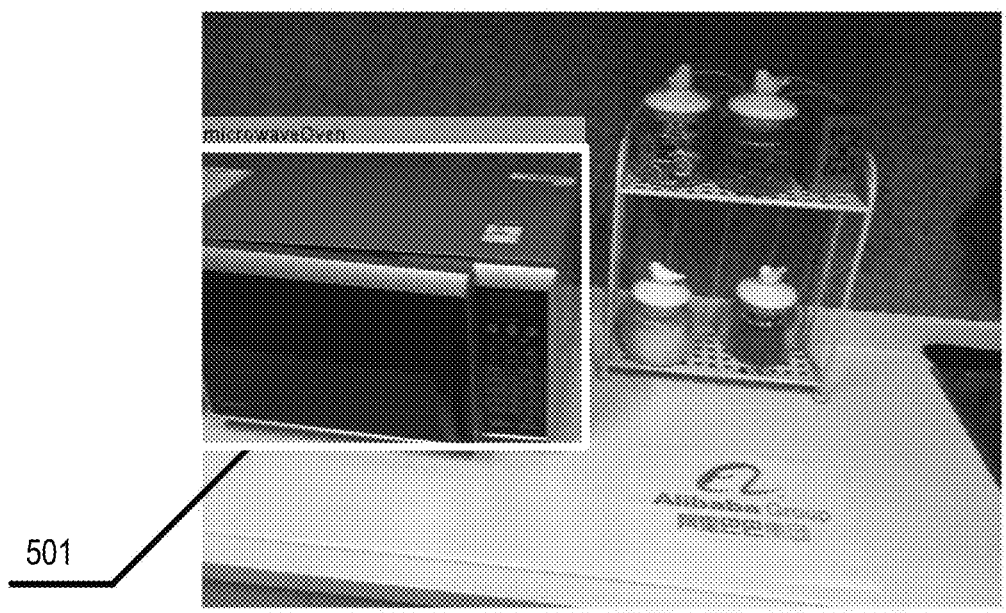
FIG. 5 is a diagram illustrating a displaying result obtained after rectangularization of a mapping result according to some embodiments of the disclosure.

In some embodiments, after the three-dimensional space model is mapped to the image planes of each image, the three-dimensional space model is displayed as a two-dimensional region. For example, in cases where the three-dimensional space model is a cuboid, the two-dimensional region is a quadrilateral shape such as a parallelogram or a rhombus. Further, when annotation requirements specify for annotations be performed using a rectangular box, the quadrangle is further adjusted in shape into a rectangle, as shown by a rectangle box 501 in FIG. 5.

In the above-described embodiments, the image training samples used are selected from the images in a same video file. In other embodiments, the image training samples can be photographs obtained by photographing a same target object from different angles in a same environment and the like. As long as the photographs, arranged in a certain order, have one or more same environmental feature points shared between the adjacent photographs, the respective camera pose information corresponding to each photograph can be determined. The subsequent annotations are substantially the same as these above-described embodiments about the images from the video file, and the details of which are not described herein again.

According to various embodiments, a target object is annotated using a relatively regular three-dimensional space model. Such a relatively regular three-dimensional space model, compared to a CAD model of the target object used in current systems, is advantageously easier to obtain. Further, in the process of automatically annotating other images using a manually annotated reference image, the three-dimensional space model is mapped back to image planes corresponding to each of the images, based on the changes in the camera poses with respect to the other images relative to the camera pose with respect to the reference image. In the photographing process, the camera poses can be recognized as long as the feature points in the environment are sufficiently distinct. In other words, the camera poses are recognized based on feature points in the entire photographing environment to automatically annotate the target object, instead of recognizing feature points of the target object to track the target object. As such, the target object is automatically annotated despite the fact that the target object is solid-colored, highly reflective, transparent, or the like.

Figure 6:
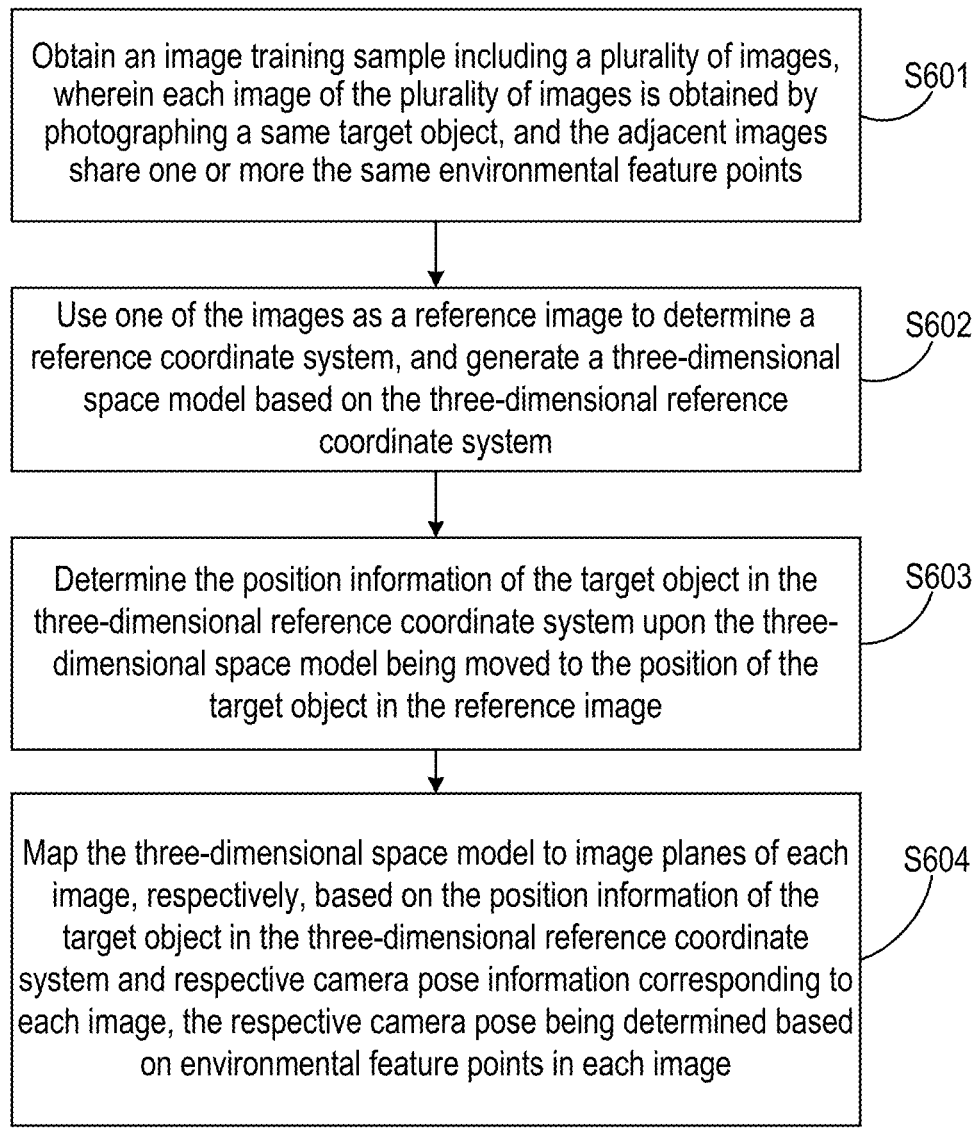
FIG. 6 is a flow diagram illustrating a method for automatic image annotation according to some embodiments of the disclosure.

FIG. 6 is a flow diagram illustrating a method for automatic image annotation according to some embodiments of the disclosure. As shown in FIG. 6, the method of automatic annotation of a target object in images includes the following steps.

Step S601: obtain an image training sample including a plurality of images, wherein each image of the plurality of images is obtained by photographing a same target object, and the adjacent images share one or more the same environmental feature points.

In some embodiments, the image training sample is obtained from one target video file. In other embodiments, the image training sample is obtained from documents such as a plurality of photographs taken in advance. For example, a target video file can be recorded prior to the automatic annotation process. In one embodiment, the image acquisition is performed on a target object in advance for purposes of applying machine learning techniques to learn the features of the target object and subsequently recognizing the target object in scenarios such as AR and the like. Afterward, the photos obtained by such image acquisition are used as the image training sample. Based on the image training sample, the target object is annotated and machine learning is performed. In one example, the corresponding video file is obtained in the image acquisition process and includes a plurality of image frames, each of which can be used as an image of the image training sample.

In some embodiments, to perform an image acquisition on a target object, the target object is placed in the middle of a scene, and then an image capture device is used to photograph the target object by circling around the target object once to generate a corresponding video file. Subsequently, a plurality of images is extracted from the video file to serve as images in the image training sample. Alternatively, any other suitable techniques can be applied to generate a plurality of photos of the target object. For instance, the target object can be photographed from a plurality of angles to generate the plurality of photographs, which are used as images of the image training sample. That is, the images included in the image acquisition result are the results obtained by photographing the target object from the respective different angles in the same environment. Thus, because of the different camera poses during photographing, the content and the angles associated with the target object that is finally displayed in image planes (e.g., image planes that a user actually observes) vary among the images. However, in cases where a reference coordinate system is determined and the photographing environment (e.g., the environment in which the target object is photographed) has sufficient feature points, the respective camera poses corresponding to the images can be computed, based on which the position of the target object in the image plane of each image can also be computed.

In some embodiments, the image training sample is selected as all of the image frames, or some of the image frames, from a pre-recorded video file. In other embodiments, the image training sample is a plurality of photographs taken in advance. Regardless of whether the image training sample includes all or some of the frames of a video, or a plurality of pictures, these images all meet the conditions that, they are obtained by photographing the same target object in the same environment and the adjacent images of these images share one or more same environmental feature points. That is, the image content of the adjacent images overlaps with each other such that changes in the camera poses in the images can be recognized.

In some embodiments, the image training sample is further pre-processed. For instance, the pre-processing includes determining a three-dimensional reference coordinate system, and determining the respective camera pose information corresponding to the images, based on the determined three-dimensional reference coordinate system and environmental feature points.

According to some embodiments, a reference image is used to achieve automatic annotation of a target object in the other images. In one embodiment, the image training sample is pre-processed, during which, the respective camera poses corresponding to the images are recognized as above-described. In some embodiments, as the camera pose is a relative concept, a three-dimensional reference coordinate system is determined first. For example, the camera coordinate system corresponding to of the first image in the video file is used as the three-dimensional reference coordinate system. For another example, special processing is performed during the image acquisition as above-described. In some embodiments, the target object, and a marker having a planar structure (e.g., a sheet of paper showing one or more words such as "Alibaba®" as shown in FIG. 2) are placed in a target environment. The planar surface of the marker is placed in parallel to the horizon. When photographing, the lens of the camera is aimed at the marker first and then the lens of the camera is moved to the position of the target object for photographing. In this manner, at the beginning of creating a three-dimensional reference coordinate system, the planar surface of the marker is recognized from the first several frames of the video file. Next, the three-dimensional reference coordinate system is established, for example, via the right-hand rule, by designating a central point of the planar surface at which the marker is located as the origin and the planar surface as the x-y plane of the reference coordinate system. Since the planar surface of the marker is parallel to the horizon, the reference coordinate system subsequently established based on the planar surface can be regarded as a world coordinate system.

After the reference coordinate system is determined, the respective camera pose information corresponding to the images is determined based on the three-dimensional reference coordinate system and environmental feature points. In some embodiments, the determining of the camera pose information can be performed using various techniques such as SLAM, and the like. As used herein, the camera pose (e.g., pose information) refers to a 3D rigid transformation between the camera coordinate system and the reference coordinate system. For example, using the visual SLAM technique, a six-degree-of-freedom (6DoF) based camera pose information is obtained by fusing the sensors of an IMU module at a device. As such, the camera's positional information in a 3D physical space is determined, based on which automatic annotation is performed in the subsequent annotation process.

In the above-described embodiments, the SLAM technique is used to determine the position of the camera in the three-dimensional physical space, instead of to track the target object. In some embodiments, the feature points of the environment in which the target object is photographed are used to determine the position of the camera, instead of the feature points of the target object itself.

Step S602: use one of the images as a reference image to determine a reference coordinate system, and generate a three-dimensional space model based on the three-dimensional reference coordinate system.

In some embodiments, at the beginning of the annotation process, one image of the image training sample is used as a reference image, which is an image that needs to be manually annotated. Before such manual annotation, a three-dimensional space model is generated based on a three-dimensional reference coordinate system first. In one embodiment, the reference coordinate system is the same as the reference coordinate system used in determining the camera pose. In this example, the three-dimensional space model is not a CAD model for the target object and therefore does not need to be provided by a manufacturer or designer of the target object. Instead, such three-dimensional space model is a regular three-dimensional space model such as a cuboid, a cylinder, a composite shape formed by combining a plurality of regular three-dimensional space models, and the like. As such, the three-dimensional space model is easily obtained. The three-dimensional space model is used to specify the position of the target object in the three-dimensional reference coordinate system. Thus, the three-dimensional space model is movable, and adjustable in its size. As such the user can move the three-dimensional space model, adjust one or more of the length, width, height of the three-dimensional space model, and so on such that the three-dimensional space model exactly encloses the target object.

Step S603: determine the position information of the target object in the three-dimensional reference coordinate system upon the three-dimensional space model being moved to the position of the target object in the reference image.

In some embodiments, when the three-dimensional space model is moved to the position of the target object, the three-dimensional space model is rendered into a state of enclosing the target object. That is, the target object is located within the three-dimensional space model. At this point in time, the manual annotation of the reference image is completed, and the position information of the target object in the three-dimensional reference coordinate system is determined. In some embodiments, the position information includes one or more of the following: displacement degrees of freedom of the target object in three dimensions of the three-dimensional reference coordinate system, rotational degrees of freedom of the target object in three dimensions of the three-dimensional reference coordinate system, the size information of the three-dimensional space model in the three dimensions, and the like.

Since the position of the target object remains unchanged during the image acquisition, the position information is fixed once determined. That is, the position of the target object relative to the three-dimensional reference coordinate system is the same and fixed in various images of the imaging training sample.

Step S604: map the three-dimensional space model to image planes of each image, respectively, based on the position information of the target object in the three-dimensional reference coordinate system and respective camera pose information corresponding to each image, the respective camera pose being determined based on environmental feature points in each image.

According to various embodiments, after the position of the target object relative to the three-dimensional reference coordinate system is determined, the three-dimensional space model is mapped to image planes of each image, respectively, based on the respective camera pose information corresponding to the images to automatically annotate the target object in the other images. In some embodiments, the three-dimensional space model is rendered into a two-dimensional shape after being mapped to image planes of each image. For example, if the three-dimensional space model is a cuboid, the three-dimensional space model is rendered into a quadrangle such as a rhombus, a parallelogram, and the like, after being mapped to the image planes. In one example, when annotation requirements specify for the annotation being performed using a rectangle, the quadrangle obtained after the above-described mapping of the three-dimensional space model is further rectangularized. In this manner, the annotation effect finally achieved is to mark a rectangular box delineating the target object in each image of the image training sample. Subsequently, the images in the rectangular boxes are used in the process of training and machine learning to establish for the target object a recognition model, which is used for recognizing the target object in scenarios such as AR applications.

According to various embodiments, a target object is annotated using a relatively regular three-dimensional space model. Such relatively regular three-dimensional space model, compared to a CAD model of the target object used in current systems, is advantageously easier to obtain. Further, in the process of automatically annotating other images using a manually annotated reference image, the three-dimensional space model is mapped back to image planes corresponding to each of the images, based on the changes in the camera poses with respect to the other images relative to the camera pose with respect to the reference image. In the photographing process, the camera poses can be recognized as long as the feature points in the environment are sufficiently distinct. In other words, the camera poses are recognized based on feature points in the entire photographing environment to automatically annotate the target object, instead of recognizing feature points of the target object to track the target object. As such, the target object is automatically annotated despite the fact that the target object is solid-colored, highly reflective, transparent, or the like.

Figure 7:
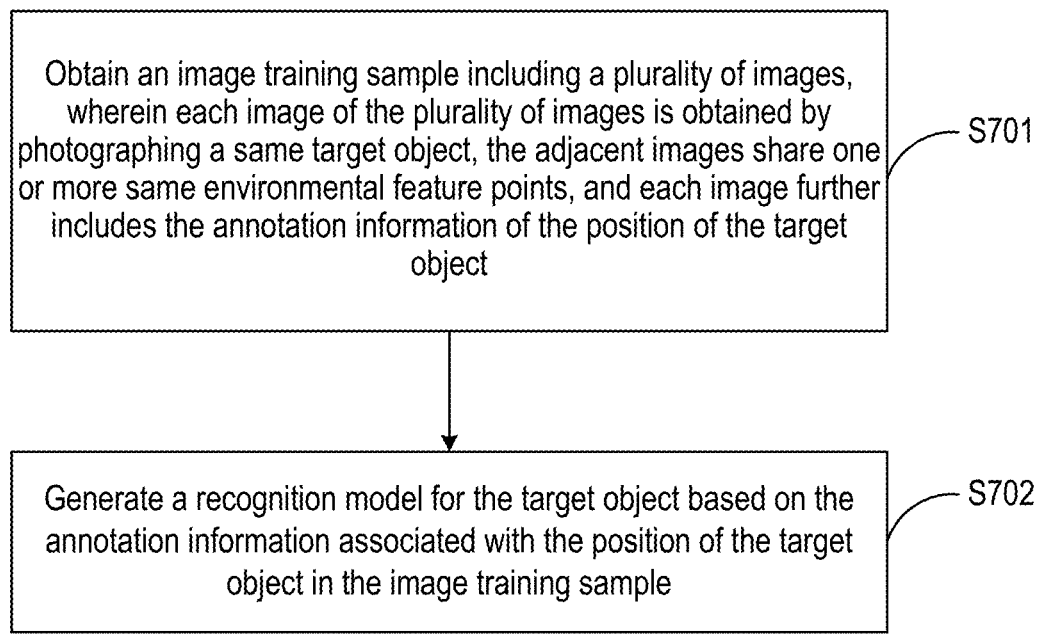
FIG. 7 is a flow diagram illustrating a method for generating an object recognition model according to some embodiments of the disclosure.

FIG. 7 is a flow diagram illustrating a method for generating a target object recognition model according to some embodiments of the disclosure. In this example, method 700 is an application of the above-described method for automatic annotation of a target object in images. That is, after the automatic annotation of a target object in the image training samples is complete, the annotated images are applied to the process of generating a target object recognition model. As shown in FIG. 7, the method for generating a target object recognition model includes the following steps.

Step S701: obtain an image training sample including a plurality of images, wherein each image of the plurality of images is obtained by photographing a same target object, the adjacent images share one or more same environmental feature points, and each image further includes the annotation information of the position of the target object. In some embodiments, the annotation information is obtained via the following: using one of the plurality of images as a reference image to generate a three-dimensional space model based on a three-dimensional reference coordinate system, determining the position information of the target object in the three-dimensional reference coordinate system based on a position to which the three-dimensional space model is moved, and mapping the three-dimensional space model to image planes of each image, respectively, based on the respective camera pose information determined based on environmental feature points in each image.

Step S702: generate a recognition model for the target object based on the annotation information associated with the position of the target object in the image training sample.

In some embodiments, the recognition model for the target object is applied to an AR interaction process to recognize the target object in a real-world image obtained by photographing, and to determine the position of the target object in the real-world image to display a virtual image associated with the target object based on the position information of the target object in the real-world image.

Figure 8:
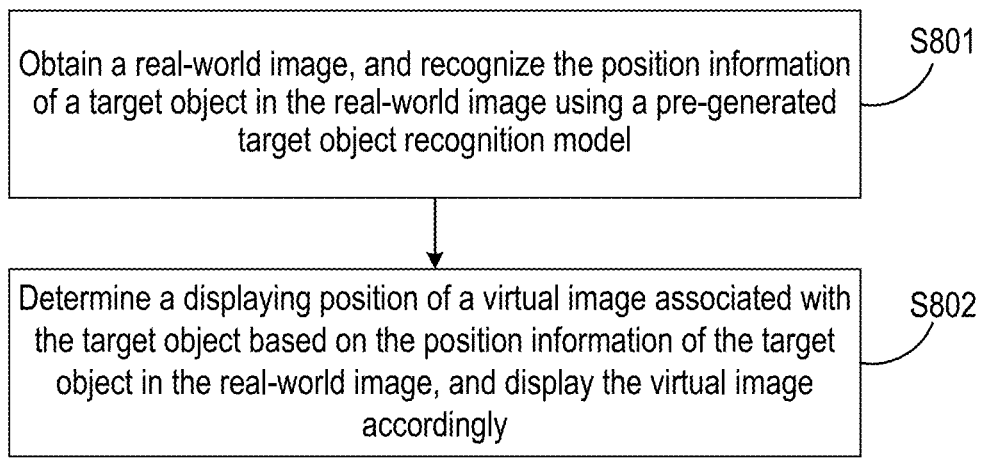
FIG. 8 is a flow diagram illustrating a method for providing AR content according to some embodiments of the disclosure.

FIG. 8 is a flow diagram illustrating a method for providing AR content according to some embodiments of the disclosure. In this example, method 800 is an application of the above-described method for generating a target object recognition model. As shown in FIG. 8, the method for providing AR content includes the following steps.

Step S801: obtain a real-world image, and recognize the position information of a target object in the real-world image using a pre-generated target object recognition model. In some embodiments, the target object recognition model is generated using the method above-described with reference to FIG. 7.

Step S802: determine a displaying position of a virtual image associated with the target object based on the position information of the target object in the real-world image, and display the virtual image accordingly.

In some embodiments, when the position of the target object in the real-world image changes, the position of the virtual image changes corresponding to the position of the real-world image.

In current technology, the changes in the position of a virtual image and the position of a real-world image oftentimes are not synchronized. For example, in a particular state, a virtual image and a real-world image are both located at position A in the picture. At a point in time, when a user moves a device such that the real-world image is moved to position B, the virtual image is still at position A, only following the position change and being subsequently moved to position B after a few seconds in the gap. In cases where the user moves the device frequently, or moves the device from left and right, or from up and down in a repetitive manner, the virtual image appears "floating," to the user, resulting in a poor displaying effect.

According to various embodiments, the above-described technical problem is solved by enabling the position of the virtual image to change following the position of the real-world image. In some embodiments, the enabling the position of the virtual image includes the following steps.

Step one: receive the information of a real-world image obtained by a first thread, and suspend the operation of the real-world image acquisition by the first thread.

Step two: provide the information of the real-world image to a second thread such that the second thread recognizes the position information of the target object in the real-world image using the target object recognition model. The second thread also determines a display position of a virtual image associated with the target object based on the position information of the target object in the real-world image.

Step three: instruct a third thread to fuse and render the real-world image acquired by the first thread and the virtual image generated by the second thread, and instruct the first thread to perform the acquisition operation for a next image.

According to various embodiments, the timing when the first thread acquires a real-world image is limited such that the second thread can determine the displaying attributes of a virtual image and complete the rendering thereof, based on the information of the real-world image acquired by the first thread, before the first thread acquires a next real-world image. This way, the displaying attributes such as the position and size of the virtual image in an AR picture can be determined strictly according to the displaying attributes (e.g., the current position and size) of the target real-world image, and can be rendered simultaneously. As such, situations where the virtual image is rendered based on the first several real-world images acquired by the camera thread are avoided, and displaying attributes (e.g., the position and size in the AR picture) of the virtual image and the real-world image change synchronously. As a result, the phenomenon of a virtual image "floating" caused by the movement of a device or the like is also avoided, thereby improving the quality and displaying effect of the AR picture.

Figure 9:
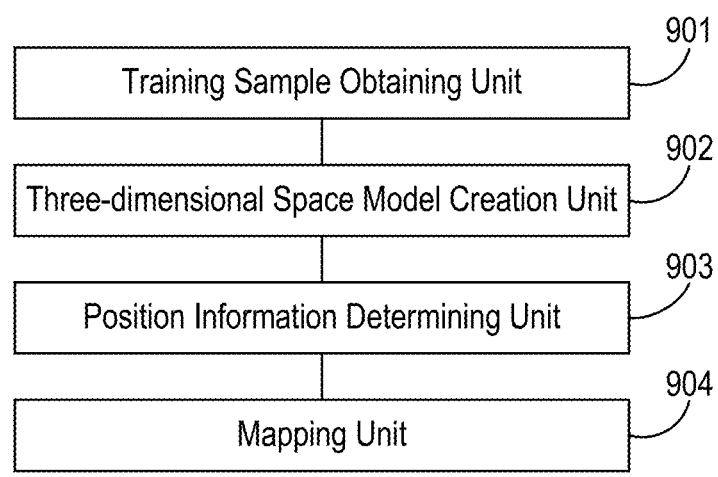
FIG. 9 is a block diagram illustrating an apparatus for automatic image annotation according to some embodiments of the disclosure.

FIG. 9 is a block diagram illustrating an apparatus for automatic image annotation according to some embodiments of the disclosure. As shown in FIG. 9, the apparatus includes a training sample obtaining unit (901), a three-dimensional space model creation unit (902), a position information determining unit (903), and a mapping unit (904).

The training sample obtaining unit (901) is configured to obtain an image training sample including a plurality of images, wherein each image of the plurality of images is obtained by photographing a same target object, and the adjacent images share one or more same environmental feature points.

The three-dimensional space model creation unit (902) is configured to use one of the plurality of images as a reference image, to determine a reference coordinate system, and to generate a three-dimensional space model based on the three-dimensional reference coordinate system.

The position information determining unit (903) is configured to determine the position information of the target object in the three-dimensional reference coordinate system, upon the three-dimensional space model being moved to the position of the target object in the reference image.

The mapping unit (904) is configured to map the three-dimensional space model to image planes of each image, respectively, based on the position information of the target object in the three-dimensional reference coordinate system and the respective camera pose determined based environmental feature points in each image.

In some embodiments, the apparatus further includes a pre-processing unit. The processing unit is configured to pre-process the image training sample by performing the following: determining the three-dimensional reference coordinate system; and determining the respective camera pose information corresponding to the images based on the three-dimensional reference coordinate system and environmental feature points.

In one example, the pre-processing unit is configured to: analyze the environmental feature point information of each image frame using a vision SLAM technique; and determine the respective camera pose corresponding to the images according to the analyzing result.

In some embodiments, the target object is located in the three-dimensional space model upon the three-dimensional space model being moved to the position of the target object in the reference image.

In some embodiments, the training sample obtaining unit (901) is further configured to: obtain a target video file and use a plurality of images in the video file as the image training sample, wherein the target video file is obtained by photographing the target object in a target environment.

In some embodiments, the three-dimensional reference coordinate system is generated via using a camera coordinate system corresponding to a first image in the video file as the three-dimensional reference coordinate system.

In other embodiments, the three-dimensional reference coordinate system is generated using the target video file captured via the following manner: placing the target object and a marker having a planar structure in a target environment, where the planar surface of the marker is placed in parallel to the horizon; first aiming the lens of a camera at the marker; and then moving the lens of the camera to the position of the target object for photographing.

In this example, the three-dimensional reference coordinate system is generated via establishing the three-dimensional reference coordinate system based on the plane where the marker is located in the first several frames of the video file.

In one embodiment, the three-dimensional reference coordinate system is generated, via the right-hand rule, by designating a central point of the plane where the marker is located as the origin and the plane itself as the x-y plane.

In some embodiments, the marker having the planar structure includes a sheet of paper on which a preset pattern is displayed.

In some embodiments, the video file is obtained by photographing via keeping the position of the target object stationary, and using a video capture device to perform photographing surrounding the target object in a circle once (e.g., 360 photography).

In some embodiments, the position information determining unit (903) is configured to: determine displacement degrees of freedom of the target object in three dimensions of the three-dimensional reference coordinate system, rotational degrees of freedom of the target object in three dimensions of the three-dimensional reference coordinate system, and size information of the three-dimensional space model in the three dimensions.

In some embodiments, the three-dimensional space model includes a cuboid model.

In some embodiments, the apparatus further includes: a rectangularization unit configured to, after the three-dimensional space model is mapped to the image planes of each image, rectangularize a quadrangle obtained upon the mapping of the three-dimensional space model.

In some embodiments, for the target object having a complex structure, the three-dimensional space model further includes a composite model formed by combining a plurality of cuboid models.

Figure 10:
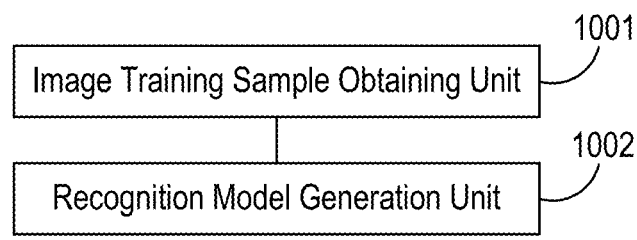
FIG. 10 is a block diagram illustrating an apparatus for generating an object recognition model according to some embodiments of the disclosure.

FIG. 10 is a block diagram illustrating an apparatus for generating a target object recognition model according to some embodiments of the disclosure. As shown in FIG. 10, the apparatus includes an image training sample obtaining unit (1001) and a recognition model generation unit (1002).

The image training sample obtaining unit (1001) is configured to obtain an image training sample including a plurality of images, where each image of the plurality of images is obtained by photographing a same target object, the adjacent images share one or more same environmental feature points, and each image of the plurality of images includes the annotation information of the position of the target object. In one example, the annotation information is obtained via the following: using one of the plurality of images as a reference image, creating a three-dimensional space model based on a three-dimensional reference coordinate system, determining the position information of the target object in the three-dimensional reference coordinate system based on a position to which the three-dimensional space model is moved, and mapping the three-dimensional space model to image planes of each image, respectively, based on respective camera poses determined based on environmental feature points in each image.

The recognition model generation unit (1002) is configured to generate a recognition model for the target object based on the annotation information on the position of the target object in the image training sample.

The recognition model for the target object is applied to an AR interaction process to recognize the target object from a real-world image obtained by photographing and to determine the position of the target object in the real-world image. Based on the results, a virtual image associated with the target object is displayed based on the position information of the target object in the real-world image.

Figure 11:
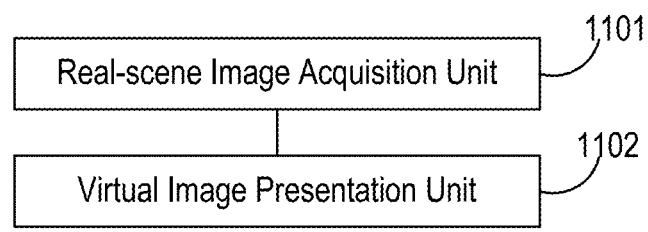
FIG. 11 is a block diagram illustrating an apparatus for providing AR content according to some embodiments of the disclosure.

FIG. 11 is a block diagram illustrating an apparatus for providing AR content according to some embodiments of the disclosure. As shown in FIG. 11, the apparatus includes a real-scene image acquisition unit (1101) and a virtual image presentation unit (1102).

The real-scene image acquisition unit (1101) is configured to obtain a real-world image and to recognize the position information of a target object in the real-world image using a pre-generated target object recognition model. In some embodiments, the target object recognition model is generated by using the above-described method with reference to FIG. 8.

The virtual image presentation unit (1102) is configured to determine a display position of a virtual image associated with the target object, based on the position information of the target object in the real-world image, and display the virtual image accordingly.

In some embodiments, the apparatus further includes a change synchronization unit. The change synchronization unit is configured to, when the position of the target object in the real-world image changes, change the position of the virtual image to follow the position of the real-world image.

In one example, the position of the virtual image changes to follow the position of the real-world image via the following: receiving the information of a real-world image obtained by a first thread, and suspending the operation of the real-world image acquisition by the first thread; providing the information of the real-world image to a second thread such that that the second thread recognizes the position information of the target object in the real-world image using a target object recognition model, and determines a display position of a virtual image associated with the target object, based on the position information of the target object in the real-world image; and instructing a third thread to fuse and render the real-world image obtained by the first thread and the virtual image generated by the second thread, as well as instructing the first thread to perform the acquisition operation of a next image.

In some embodiments, the disclosure provides a computer system including one or a plurality of processors, and a memory coupled with the one or plurality of processors. The memory is configured to store program instructions, which, when read and executed by the one or plurality of processors, performs the operations of: obtaining an image training sample including a plurality of images, where each image of the plurality of images is obtained by photographing a same target object, the adjacent images share one or more same environmental feature points, using one of the plurality of images as a reference image to determine a reference coordinate system, and creating a three-dimensional space model based on the three-dimensional reference coordinate system; determining the position information of the target object in the three-dimensional reference coordinate system upon the three-dimensional space model being moved to the position of the target object in the reference image; and mapping the three-dimensional space model to image planes of each image, respectively, based on the position information of the target object in the three-dimensional reference coordinate system and respective camera pose information determined based on environmental feature points in each image.

Figure 12:
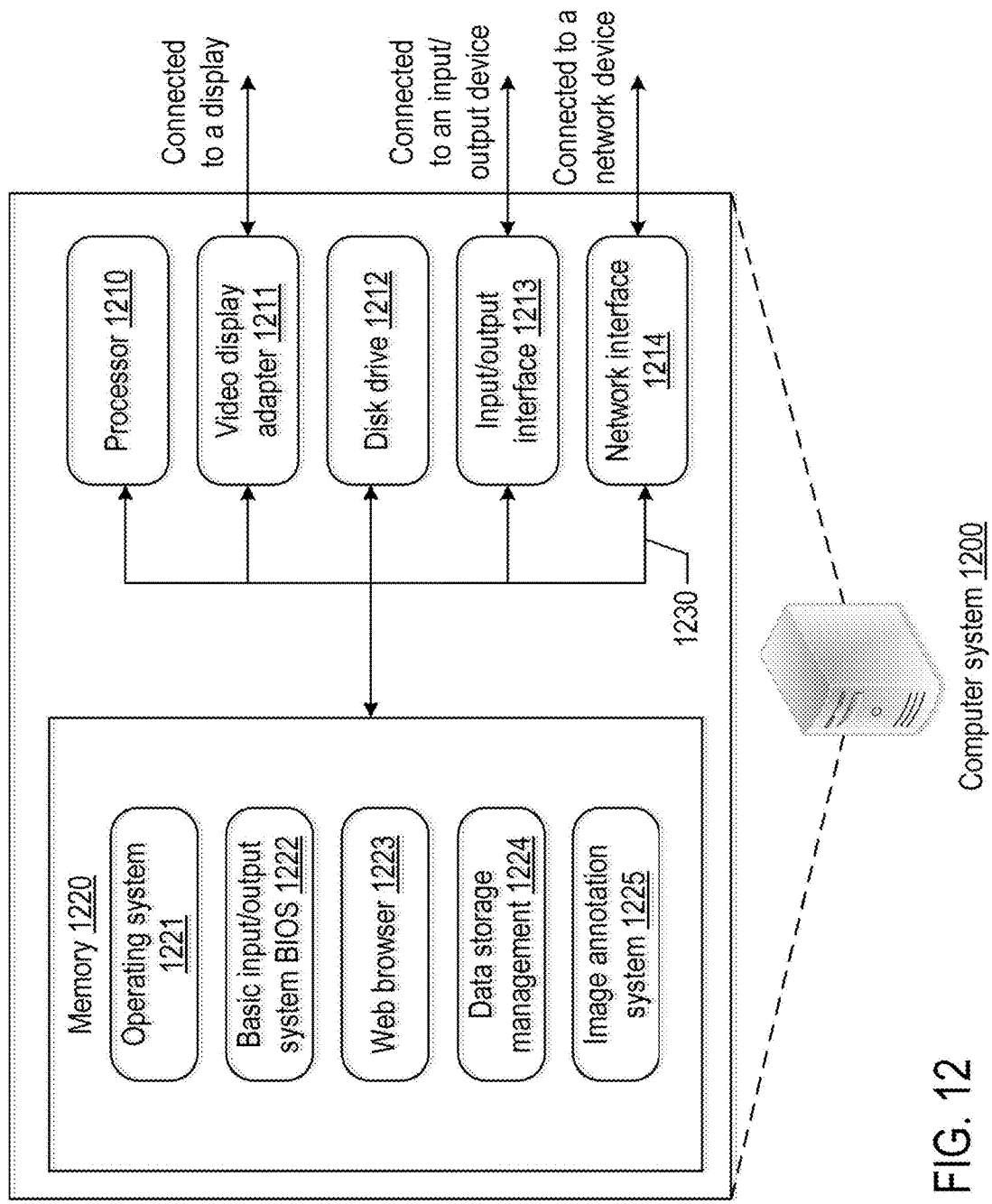
FIG. 12 is a block diagram illustrating a computer system according to some embodiments of the disclosure.

FIG. 12 is a block diagram illustrating a computer system architecture according to some embodiments of the disclosure. As shown in FIG. 12, the computer system architecture includes a processor (1210), a video display adapter (1211), a disk drive (1212), an input/output interface (1213), a network interface (1214), and a memory (1220). The processor (1210), video display adapter (1211), disk drive (1212), input/output interface (1213), network interface (1214), and memory (1220) are communicatively connected to each other through a communication bus (1230).

The processor (1210) is implemented by using a general-purpose CPU (Central Processing Unit), a microprocessor, an application-specific integrated circuit (ASIC), or one or a plurality of integrated circuits, and configured to execute relevant programs to implement the technical solutions provided in the disclosure.

The memory (1220) is implemented in the form of a ROM (Read Only Memory), a RAM (Random Access Memory), a static storage device, a dynamic storage device, or the like. The memory (1220) may store an operating system (1221) used for controlling the running of the computer system (1200), and a basic input/output system (BIOS) (1222) used for controlling the low-level operation of the computer system (1200). In addition, memory (1220) may further store a web browser (1223), a data storage management system (1224), an image annotation system (1225), and so on. In some embodiments, the image annotation system (1225) is an application that implements the afore-described steps and methods. When the technical solutions provided in the disclosure are implemented using software or firmware, the relevant program code is stored in the memory (1220) and invoked and executed by the processor (1210).

The input/output interface (1213) is configured to be connected to an input/output module to input and output information. The input/output module may be configured as a component in a device (not shown in the figure) or may be externally connected to the device to provide a corresponding function. The input device may include a keyboard, a mouse, a touch screen, a microphone, various sensors, and so on, and the output device may include a display, a loudspeaker, a vibrator, an indicator, and so on.

The network interface (1214) is configured to be connected to a communication module (not shown) to implement communication interaction between the local device and other devices. The communication module may implement communication in a wired manner (for example, through a USB or a network cable), or may implement communication in a wireless manner (e.g., through a mobile network, Wi-Fi, or Bluetooth).

The bus (1230) includes a path that transmits information between various components (for example, the processor (1210), the video display adapter (1211), the disk drive (1212), the input/output interface (1213), the network interface (1214), and the memory (1220) of the device.

In some embodiments, the computer system (1200) further obtains, from a virtual resource object retrieval condition information database (1241), information of a retrieval condition for use in condition determination, and so on.

It should be noted that although only the processor (1210), the video display adapter (1211), the disk drive (1212), the input/output interface (1213), the network interface (1214), the memory (1220), and the bus (1230) are shown herein, in some embodiments, the computer system (1200) may further include other components necessary for normal operations. Furthermore, those skilled in the art can understand that the computer system (1200) may also include only the components necessary to implement the solutions provided of the disclosure, without the need to include all the components shown herein.

Through the above description of the embodiments, those skilled in the art can understand that the embodiments of disclosure can be implemented by software and a necessary hardware platform. As such, the technical solutions and the technical improvement provided of the disclosure may be embodied in the form of a software product. The computer software product may be stored in a storage medium such as a ROM/RAM, a magnetic disk, or an optical disc, and include several instructions to instruct a computer device (which may be a personal computer, a server, a network device, or the like) to perform the methods described in the embodiments or portions of the embodiments according to the disclosure.

Some embodiments are described herein a progressive manner. For identical or similar portions between different embodiments, reference is made to each other such that each of the embodiments focuses on differences from other embodiments. Because the systems are substantially similar to the methods, the description for the systems is relatively concise; and reference can be made to the description of the method for relevant descriptions. The systems described above are merely exemplary. The units described as separate parts may or may not be physically separated; and the components shown as units may or may not be physical units. That is, the components may be located in one place or may be distributed among a plurality of network units. The objective of the solution of the embodiments can be achieved by selecting some or all of the modules according to actual requirements. Those of ordinary skill in the art can understand and implement the disclosure without making significant efforts.

The methods, apparatuses, and systems for automatically annotating a target object in an image provided in the disclosure are described in detail hereinabove, and the principles and implementations of the disclosure are described by using examples and embodiments. The above-described embodiments are merely used to help understand the solutions and core idea provided of the disclosure. Meanwhile, for those of ordinary skill in the art, modifications can be made to the implementations and application scopes based on the disclosure. In view of the above, the content herein should not be construed as any limitation to the disclosure.

What is claimed is:

1. A method comprising:
obtaining an image training sample comprising a series of images, each image of the series of images obtained by photographing a target object, and adjacent images of the series of images sharing one or more environmental feature points;
using one of the series of images as a reference image to determine a three-dimensional reference coordinate system, and generating a three-dimensional space model based on the three-dimensional reference coordinate system, the three-dimensional space model comprising a composite object formed by regular objects;
determining, when the three-dimensional space model is moved to a position of the target object in the reference image, position information of the target object in the three-dimensional reference coordinate system based on the position to which the three-dimensional space model is moved, the three-dimensional space model further adjusted to shape conformingly enclose a shape of the target object; and
mapping the three-dimensional space model to image planes of each image in the series of images based on the position information of the target object in the three-dimensional reference coordinate system and respective camera pose information corresponding to each image in the series of images, the respective camera pose determined based on environmental feature points in each image.

2. The method of claim 1, further comprising pre-processing the image training sample, the pre-processing comprising:
determining the three-dimensional reference coordinate system; and
determining the respective camera pose information corresponding to the images based on the three-dimensional reference coordinate system and the environmental feature points.

3. The method of claim 2, the determining the respective camera pose information corresponding to the images based on the three-dimensional reference coordinate system comprising:
analyzing environmental feature point information of each image using a visual simultaneous localization and mapping (SLAM) technique; and
determining the respective camera pose information corresponding to each image of the series of images based on an analyzing result.

4. The method of claim 1, the target object being located within the three-dimensional space model when the three-dimensional space model is moved to the position of the target object in the reference image.

5. The method of claim 1, the obtaining the image training sample comprising:
obtaining a target video file; and
using a series of images in the video file as the series of images of the image training sample, the target video file being obtained by photographing the target object in a target environment.

6. The method of claim 5, the determining the three-dimensional reference coordinate system comprising: using a camera coordinate system of a first image in the video file as the three-dimensional reference coordinate system.

7. The method of claim 5, the target video file being captured by:
placing the target object and a marker having a planar structure in the target environment, the plane of the marker being placed in parallel to a horizon;
aiming a lens of an imaging device at the marker for photographing;
moving the lens of the imaging device to a position of the target object for photographing; and
the determining the three-dimensional reference coordinate system comprises establishing the three-dimensional reference coordinate system based on a plane at which the marker is located in first several frames of the video file.

8. The method of claim 7, the establishing the three-dimensional reference coordinate system based on the plane at which the marker is located comprising establishing the three-dimensional reference coordinate system, based on a right-hand rule, by designating a central point of the plane at which the marker is located as an origin, and designating the plane as an x-y plane.

9. The method of claim 1, further comprising rendering a first 2-D shape obtained upon the mapping of the three-dimensional space model to the image planes of each image into a second 2-D shape.

10. A non-transitory computer-readable storage medium for tangibly storing computer program instructions capable of being executed by a computer processor, the computer program instructions defining the steps of:
obtaining an image training sample comprising a series of images, each image of the series of images obtained by photographing a target object, and adjacent images of the series of images sharing one or more environmental feature points;
using one of the series of images as a reference image to determine a three-dimensional reference coordinate system, and generating a three-dimensional space model based on the three-dimensional reference coordinate system, the three-dimensional space model comprising a composite object formed by regular objects;
determining, when the three-dimensional space model is moved to a position of the target object in the reference image, position information of the target object in the three-dimensional reference coordinate system based on the position to which the three-dimensional space model is moved, the three-dimensional space model further adjusted to shape conformingly enclose a shape of the target object; and
mapping the three-dimensional space model to image planes of each image in the series of images based on the position information of the target object in the three-dimensional reference coordinate system and respective camera pose information corresponding to each image in the series of images, the respective camera pose determined based on environmental feature points in each image.

11. The computer-readable storage medium of claim 10, the computer program instructions further defining a step of pre-processing the image training sample, the pre-processing comprising:
determining the three-dimensional reference coordinate system; and determining the respective camera pose information corresponding to the images based on the three-dimensional reference coordinate system and the environmental feature points.

12. The computer-readable storage medium of claim 11, the determining the respective camera pose information corresponding to the images based on the three-dimensional reference coordinate system comprising:
   analyzing environmental feature point information of each image using a visual simultaneous localization and mapping (SLAM) technique; and
   determining the respective camera pose information corresponding to each image of the series of images based on an analyzing result.

13. The computer-readable storage medium of claim 10, the target object being located within the three-dimensional space model when the three-dimensional space model is moved to the position of the target object in the reference image.

14. The computer-readable storage medium of claim 10, the obtaining the image training sample comprising:
   obtaining a target video file; and
   using a series of images in the video file as the series of images of the image training sample, the target video file being obtained by photographing the target object in a target environment.

15. The computer-readable storage medium of claim 10, the computer program instructions further comprising rendering a first 2-D shape obtained upon the mapping of the three-dimensional space model to the image planes of each image into a second 2-D shape.

16. An apparatus comprising:
   a processor; and
   a storage medium for tangibly storing thereon program logic for execution by the processor, the stored program logic comprising:
      logic, executed by the processor, for obtaining an image training sample comprising a series of images, each image of the series of images obtained by photographing a target object, and adjacent images of the series of images sharing one or more environmental feature points,
      logic, executed by the processor, for using one of the series of images as a reference image to determine a three-dimensional reference coordinate system, and generating a three-dimensional space model based on the three-dimensional reference coordinate system, the three-dimensional space model comprising a composite object formed by regular objects,
      logic, executed by the processor, for determining, when the three-dimensional space model is moved to a position of the target object in the reference image, position information of the target object in the three-dimensional reference coordinate system based on the position to which the three-dimensional space model is moved, the three-dimensional space model further adjusted to shape conformingly enclose a shape of the target object, and
      logic, executed by the processor, for mapping the three-dimensional space model to image planes of each image in the series of images based on the position information of the target object in the three-dimensional reference coordinate system and respective camera pose information corresponding to each image in the series of images, the respective camera pose determined based on environmental feature points in each image.

17. The apparatus of claim 16, the stored program logic further comprising:
   logic, executed by the processor, for pre-processing the image training sample, the pre-processing comprising:
      determining the three-dimensional reference coordinate system; and
      determining the respective camera pose information corresponding to the images based on the three-dimensional reference coordinate system and the environmental feature points.

18. The apparatus of claim 17, the logic for determining the respective camera pose information corresponding to the images based on the three-dimensional reference coordinate system comprising:
   logic, executed by the processor, for analyzing environmental feature point information of each image using a visual simultaneous localization and mapping (SLAM) technique; and
   logic, executed by the processor, for determining the respective camera pose information corresponding to each image of the series of images based on an analyzing result.

19. The apparatus of claim 16, the target object being located within the three-dimensional space model when the three-dimensional space model is moved to the position of the target object in the reference image.

20. The apparatus of claim 16, the logic for obtaining the image training sample comprising:
   logic, executed by the processor, for obtaining a target video file; and
   logic, executed by the processor, for using a series of images in the video file as the series of images of the image training sample, the target video file being obtained by photographing the target object in a target environment.

* * * * *